March 30, 1965 G. J. WYERS ETAL 3,175,738
MEANS FOR DISPENSING MEASURED QUANTITIES OF LIQUID
Filed Sept. 16, 1963
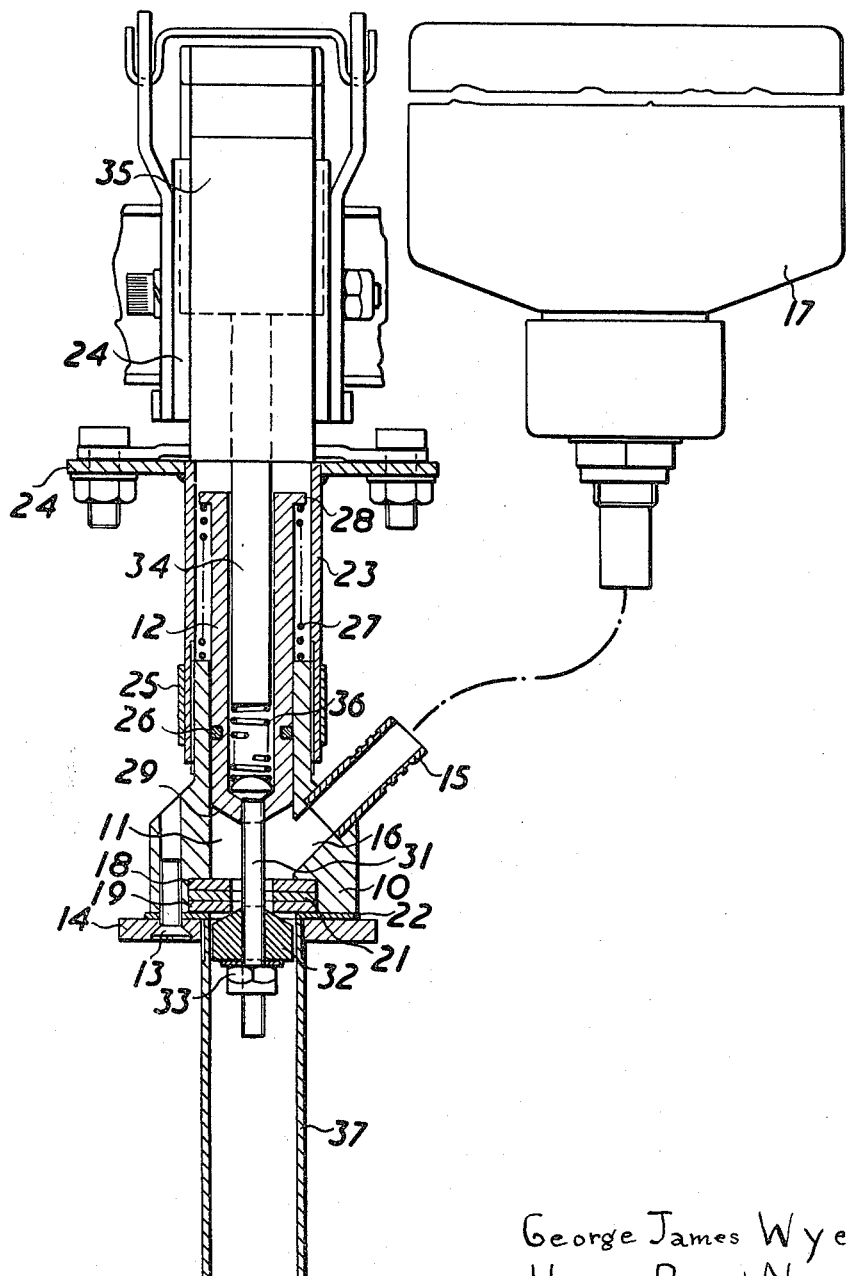
George James Wyers
Henry Patrick Norton
BY Scrivener + Parker

United States Patent Office 3,175,738
Patented Mar. 30, 1965

3,175,738
MEANS FOR DISPENSING MEASURED
QUANTITIES OF LIQUID
George James Wyers, Staffordshire, and Henry Patrick Norton, Worcestershire, England, assignors to Rubery, Owen and Company Limited, Darlaston, England, a British company
Filed Sept. 16, 1963, Ser. No. 309,057
Claims priority, application Great Britain, Feb. 19, 1963, 6,572/63
5 Claims. (Cl. 222—309)

This invention relates to means for delivering measured quantities of liquid.

Our invention is primarily intended for dispensing measured quantities of liquid detergent or wetting agent to a machine for washing clothes or dishes, but the dispenser can be applied to any other purpose where the delivery of liquid in relatively small measured quantities is required.

In means for dispensing measured quantities of liquid according to our invention, liquid is fed from a container into a substantially vertical bore in a body adjacent to the lower end thereof and is discharged through a double-sided valve seating at the lower end of the bore by downward movement of a spring-loaded plunger which works in the bore and from which a stem extends downwardly through the valve seating, the stem carrying a valve head which normally engages and closes the underside of the valve seating and the head being moved away from the seating by depression of the plunger which forces liquid in the lower part of the bore out through the seating until the lower end of the plunger engages the upper side of the seating.

The lower part of the bore between the plunger and the valve seating forms a measuring chamber of which the effective volume can be varied by adjustment of the axial position of the valve head on the stem.

The plunger may be actuated manually, but where the dispenser is used for supplying measured quantities of detergent or wetting agent to a washing machine it will normally be actuated by a solenoid which is energised automatically at an appropriate point in the cycle of operations.

One form of dispenser in accordance with our invention which is intended for dispensing liquid detergent or liquid rinse aid in a dish-washing machine is illustrated by way of example in the accompanying drawing which is a vertical section of the dispenser.

The main part of the dispenser comprises a body 10 having a vertical bore 11 in which works a hollow plunger 12. The body is secured by screws 13 to a mounting bracket 14 adapted to be located in a convenient position in the machine.

The lower part of the bore 11 forms the measuring chamber and an inlet tube 15 is brazed or otherwise secured into the other end of an inclined passage 16 in the body leading into the measuring chamber. The outer end of the inlet tube is adapted to be connected by a flexible pipe to a container 17 for the liquid to be dispensed, the container being located in an elevated position so that the liquid flows to the measuring chamber under gravity. At the lower end of the measuring chamber there is a double-sided valve seat formed by upper and lower washers 18, 19 of synthetic rubber between which is a metal washer 21. The three washers are located in a recess in the lower end of the body in which they are clamped when the body is secured to the mounting bracket. A sealing washer 22 is interposed between the body and the bracket.

The upper end of the body is of reduced diameter and is externally screw-threaded. It is screwed into the lower end of a tube 23 brazed or otherwise secured into a plate 24 on which is mounted a solenoid 24. The lower end of the tube 23 is split and is closed on to the body by a clip 25.

The plunger 12 which works in the bore in the body and carries an O-ring seal 26 extends upwardly into the tube 23 and a compression spring 27 fitting around the upper part of the plunger abuts between the upper end of the body and a radial flange 28 on the upper end of the plunger to hold the plunger normally in the raised position shown in the drawing.

The lower end of the plunger is coned as shown at 29 for engagement with the upper seating washer 18 when the plunger is depressed. A stem 31 of reduced diameter is fixed at its upper end in the lower end of the plunger and extends downwardly through the valve seatings. A coned valve head 32 is adjustably screwed on to the lower end of the stem for engagement with the lower seating washer 19 when the plunger is in its normal raised position. The stem is locked in its adjusted position by a lock-nut 33.

A push-rod is slidable in the bore of the plunger and is located between the armature 35 of the solenoid and a spring 36 interposed between the lower end of the rod and the head of the stem 31.

In the position of the parts shown in the drawing the valve head 32 engages the seating washer 19 and closes the lower end of the measuring chamber and the lower end of the plunger is clear of the inner end of the inlet passage 16 so that the measuring chamber fills with liquid from the container.

On energisation of the solenoid the push-rod 34, through the spring 36, depressed the plunger so that the valve head 32 moves away from the seating washer 19 and the plunger discharges the liquid in the measuring chamber through the valve seating. As the plunger moves downwardly it closes off the passage 16 and discharge ceases when the coned lower end of the plunger engages the upper seating washer 18.

The volume of liquid discharged by each operation of the plunger can be readily adjusted by adjusting the axial position of the valve head 32 on the stem 31.

The liquid may be discharged directly into the machine or into a delivery tube 37 depending from the mounting bracket.

On de-energisation of the solenoid the parts are returned to the positions shown in the drawing by the springs 27 and 36 and the measuring chamber fills again with liquid.

The spring 36 allows a wide tolerance between the solenoid and the plunger and also acts as a damper to prevent a pumping action if the solenoid is energised by alternating current.

It will be understood that where the dispenser is used for dispensing detergent or a wetting agent in a machine for washing clothes or dishes the energisation of the solenoid will be effected automatically at an appropriate point in the cycle of operations.

In other applications of the dispenser the plunger may be operated manually.

The container 17 for the liquid will normally be open to atmosphere but in some cases it may be desirable to use a sealed container in order to avoid evaporation of the liquid. Where a sealed container is used sufficient air can pass upwardly through the valve seating on the return movement of the plunger to allow further liquid to flow from the container to the dispenser.

Where a sealed container is used with a dispenser on a washing machine the container may be connected to the dispenser by a flexible tube of transparent plastic which is exposed at a convenient point so that the operator can be satisfied by seeing a bubble of air pass up the tube that liquid has been fed from the container and delivered into the machine.

We claim:

1. Means for dispensing measured quantities of liquid comprising a body, a substantially vertical bore in the body, a port leading into said bore adjacent to the lower end thereof and adapted to be connected to a container for the liquid to be dispensed, a closure for the lower end of the bore, an axial passage through said closure, upper and lower valve seats at the top and bottom ends of said passage, a plunger working in the bore, spring means urging said plunger in an upward direction, a stem extending downwardly from the plunger through said passage in the closure, and a valve head on the lower end of said stem which normally engages the lower valve seat and closes said passage, depression of the plunger moving the valve head away from the lower seat and forcing liquid in the lower end of the bore out through the passage in the closure until the lower end of the plunger engages the upper valve seat, said valve head being adjustable axially on the stem for varying the volume of liquid delivered on each depression of the plunger.

2. Means for dispensing measured quantities of liquid as in claim 1 wherein said closure for the lower end of the bore comprises upper and lower washers of synthetic rubber and a metal washer located between said synthetic rubber washers, the three washers being held in a recess in the body at the lower end of the bore.

3. Means for dispensing measured quantities of liquid as in claim 1 wherein the lower end of the plunger and the valve head are coned for engagement with the upper and lower valve seats respectively.

4. Means for dispensing measured quantities of liquid as in claim 1 incorporating an axial recess in said plunger extending downwardly from its upper end, a push-rod slidable in said recess, and a compression spring located between the lower end of said push-rod and the bottom of said recess, the push-rod acting on the plunger through said spring.

5. Means for dispensing measured quantities of liquid as in claim 1 wherein said container is sealed and is connected to said port by a flexible tube of transparent plastic.

References Cited by the Examiner
UNITED STATES PATENTS

| | | | |
|---|---|---|---|
| 863,213 | 8/07 | Perry | 222—380 X |
| 2,925,102 | 2/60 | Cummings et al. | 222—504 |

RAPHAEL M. LUPO, *Primary Examiner.*

LOUIS J. DEMBO, *Examiner.*